United States Patent [19]

Wiknich et al.

[11] 4,399,907

[45] Aug. 23, 1983

[54] ACCUMULATING CONVEYOR

[75] Inventors: Douglas D. Wiknich; Michael J. Peabody, both of Troy, Mich.

[73] Assignee: LaSalle Machine Tool, Inc., Troy, Mich.

[21] Appl. No.: 251,066

[22] Filed: Apr. 6, 1981

[51] Int. Cl.³ .............................................. B65G 25/10
[52] U.S. Cl. ................................................... 198/718
[58] Field of Search ............................. 198/751, 718; 74/483 PB

[56] References Cited

U.S. PATENT DOCUMENTS 3,570,656 3/1971 Manetta .............................. 198/718
3,687,275 8/1972 Broser ................................. 198/751
4,349,099 9/1982 Wiknich et al. ..................... 198/751

FOREIGN PATENT DOCUMENTS 1105957 5/1961 Fed. Rep. of Germany ... 74/483 PB
1902698 8/1970 Fed. Rep. of Germany ...... 198/751
1254093 11/1971 United Kingdom .
659472 4/1979 U.S.S.R. ............................. 198/718

Primary Examiner—John J. Love
Assistant Examiner—Paul A. Sobel
Attorney, Agent, or Firm—Stephenson and Boller

[57] ABSTRACT

A shuttle type accumulating conveyor adapted to advance articles located behind an empty station to their next successive stations. The conveyor comprises an elongated support along which the stations are longitudinally spaced apart, a transfer bar movable forwardly and rearwardly longitudinally of the elongated support, pusher type feed units and feed unit setting assemblies mounted on the transfer bar and actuator assemblies for moving the feed units to feed positions so that upon an initial rearward movement of the transfer bar from a start position all feed units behind an empty station are moved to their feed positions. The transfer bar is then moved forward a distance substantially greater than the distance between stations to advance articles from station to station. Binding of the drive mechanism due to the prolonged travel of the transfer bar, during which feed unit setting assemblies contact actuator assemblies, is prevented by cooperating recess and pivot means on the actuator assemblies. Knockdown means are provided to move all feed units out of their feed positions before the start of a work cycle.

15 Claims, 16 Drawing Figures

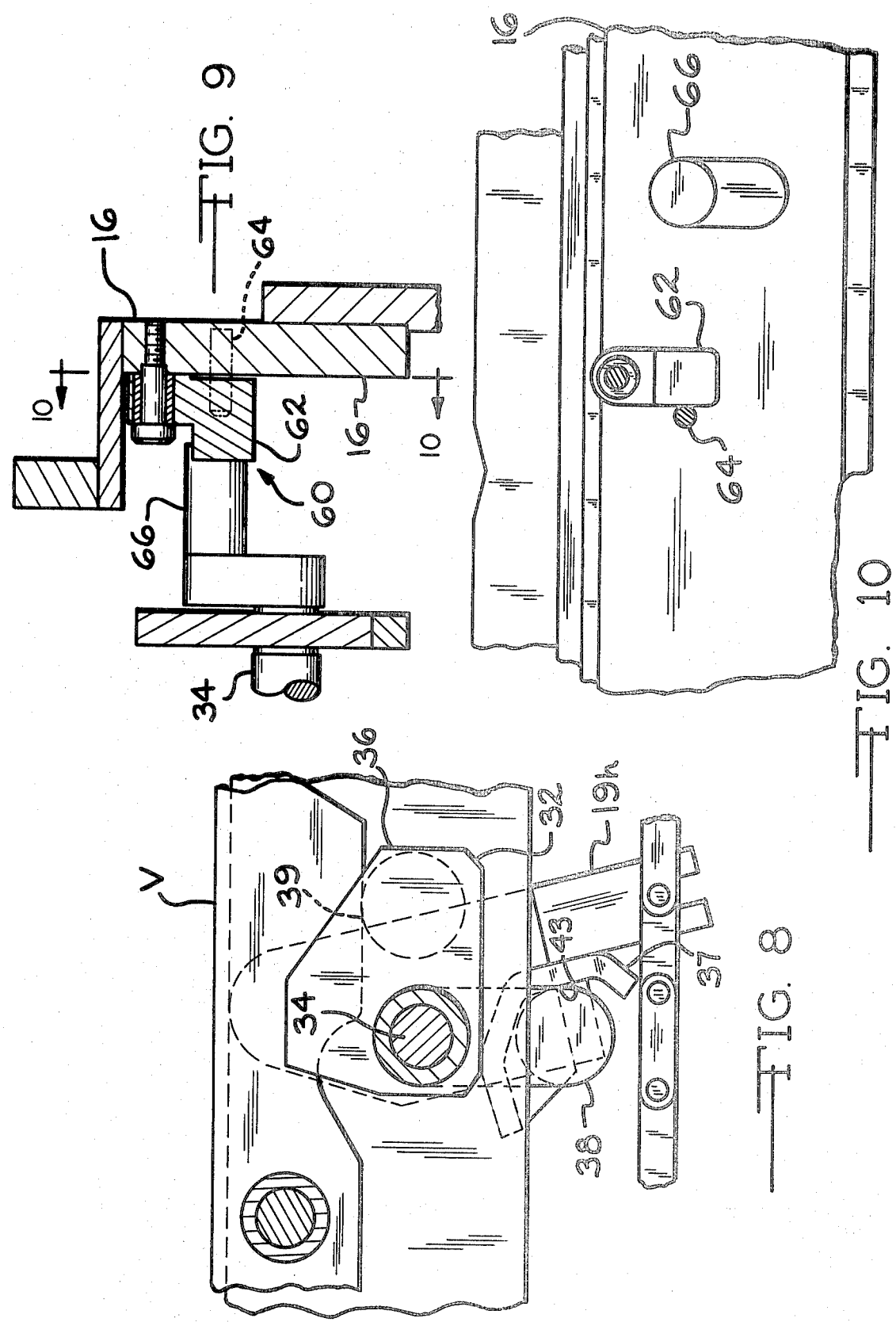

ACCUMULATING CONVEYOR

RELATED APPLICATION

This application discloses a conveyor similar to the conveyor disclosed in co-pending applications Ser. Nos. 144,561 and 144,631 filed Apr. 28, 1980, assigned to the assignee of this application.

BACKGROUND OF THE INVENTION

The present invention relates to a mechanical accumulating conveyor operable to advance articles located behind an empty station to their next successive stations to ensure that any empty station will be filled by an article. In particular, this invention relates to shuttle type accumulating conveyors where articles are pushed from station to station rather than being lifted at one station, carried to the next station and deposited there.

U.S. Pat. No. 4,349,099 discloses a lift-and-carry type accumulator which has performed satisfactorily. The accumulator disclosed therein commprises an elongated support along which a series of stations are provided, a transfer bar on which feed units and feed unit setting assemblies are provided, and coacting article sensors and actuator members which are positioned on the support at each station. The work cycle begins with a rearward movement of the transfer bar, which causes all feed units to the rear of an empty station to be raised to their feed positions. The transfer bar is then raised so that the feed units lift all of the articles to the rear of the empty station. The transfer bar is then moved forwardly a distance equal to the distance between stations, then lowered to deposit articles at their next successive stations. Subsequently, the transfer bar is moved rearwardly again and all feed units are moved out of their feed positions before the start of the next cycle. Machines of this type have performed with excellence. However, there are several advantages to shuttle type accumulators and it is a general object of the present invention to provide an improved shuttle type accumulator which utilizes the principles of the aforementioned U.S. Patent.

The principal advantage of shuttle accumulators over lift-and-carry type accumulators is that the former require a much simpler motion of the transfer mechanism. In general, a transfer bar in shuttle accumulators need only move forward and rearward and need not travel up and down. Thus, a shuttle type accumulator may be simpler to operate and less costly than a lift-and-carry type accumulator.

However, several problems have been encountered in shuttle type conveyors. First, it is found that, since the feed units must be initially positioned behind the articles in order to push them to the next stations, the transfer bar must travel a distance greater than the distance between stations. Parts attached to the transfer bar, such as the feed unit setting assemblies, tend to interfere with parts attached to the support, such as the actuator members, when the transfer bar moves to its full forward position. This can cause the drive mechanism to bind or stall. It is another object of the present invention, therefore, to provide a shuttle type accumulating conveyor in which such a binding problem is avoided.

Another problem encountered in shuttle accumulators is in the mechanism which resets the feed units prior to the start of a work cycle. In lift-and-carry accumulators, each feed unit setting assembly is moved in a forward direction only while the transfer bar is raised, overpassing a knockdown lug. On the return stroke, the transfer bar is lowered and the feed unit setting assembly engages the knockdown lug and this causes the associated feed unit to be reset. In a shuttle type accumulator, in which the transfer bar is not raised and lowered, the feed unit setting assemblies engage the knockdown lug on both the advance and return strokes. It is another object of the present invention, therefore, to provide an improved shuttle type accumulating conveyer wherein the knockdown problem is overcome.

SUMMARY OF THE INVENTION

The present invention provides a mechanical accumulating conveyor comprising an elongated support along which a plurality of articles are movable through a series of longitudinally spaced-apart stations. An article sensor, an associated actuator assembly and a knockdown unit are fixed to the support at each of the stations. A chain member is provided to connect adjacent actuator assemblies, each actuator assembly having a lower end portion which is secured to the chain. A transfer bar is provided for forward and rearward movement longitudinally along the support. The transfer bar carries a plurality of feed units and associated feed unit setting assemblies operable to move articles from station to station.

Each article sensor is pivotally mounted on the support and is movable between an article sensed position and an empty station position. Each actuator member is pivotally mounted on the support for movement between an operative position, an inoperative position and an advanced position, and carries a cam member which has an upwardly and rearwardly inclined surface and a protruding nose portion. When the article sensor is in its empty station position, it engages the protruding nose on the associated actuator assembly and holds the actuator assembly in its operative position. The chain then operates to hold the actuator assemblies at stations behind the empty station in their operative positions, that is, the chain prevents them from moving to their inoperative positions.

The feed units are pivotally mounted on the transfer bar for movement between idle and feed positions. Each feed unit setting assembly comprises a follower and a rigid arm which are maintained at a fixed angle relative to each other and which are pivotally mounted on the transfer bar. The setting assembly is pivotally movable between a rest position, where the follower extends downwardly, and an actuated position, where the follower extends horizontally.

At the start of the work cycle, the feed units are initially in their idle positions. If one of the stations is empty, the sensor at that station is maintaining the associated actuator assembly, and all actuator assemblies to the rear, in their operative positions. The first movement of the transfer bar is to the rear a predetermined distance. As the transfer bar moves rearwardly, each of the follower members initially contacts the cam on a corresponding actuator assembly. At stations where the actuator assemblies are held operative, the followers ride up on the inclined cam surfaces; the setting assemblies are thus moved to their actuated positions and this causes the associated feed units to be moved to their feed positions, in which positions they are operable to advance articles. At stations where the actuator assemblies are not held operative, that is, at stations in front of the empty station, the followers contact the cam members and force the actuator assemblies to their inoperative positions. Thus, feed units in front of the empty station are maintained in their idle positions.

The next movement of the transfer bar is forward a predetermined distance which is greater than the distance between stations and less than twice the distance between stations. This movement causes all articles originally located behind the empty station to be moved to their next successive stations. This movement also introduces the bind problem. Feed unit setting assemblies in their rest positions travel forward with the transfer bar a distance greater than the distance between stations. Before the end of their travel, the followers contact the cams on actuator assemblies at the next adjacent stations. This contact, rather than preventing further forward movement of the transfer bar and causing the drive mechanism to bind, is absorbed in the present invention due to anti-bind means provided on the actuator assemblies.

The anti-bind means of this invention comprises cooperating recess and pivot means on each actuator assembly. Each cam member has a hollowed rear portion into which a follower is received when the transfer bar moves forward. The actuator assembly moves to its advanced position when contacted by the follower. A recess is provided in the front of the actuator assembly to provide clearance between the actuator and the associated article sensor. Thus, the hollowed portion, the pivot and the recess each absorb some of the extra distance travelled by the follower, and ensure unobstructed forward movement of the transfer bar.

The final movement of the transfer bar is again rearward to reset the feed units to their idle positions. This invention provides an improved knockdown means comprising a rigid arm pivotally mounted on the support at each station and a stop pin mounted on the support adjacent the rigid arm on the rear side. When the transfer bar moves forward, a feed unit setting assembly in the actuated position contacts the knockdown arm and moves it out of the way. When the transfer bar subsequently moves rearwardly, the feed unit setting assembly contacts the knockdown lug, which is held stationary by the stop pin, and is moved to its rest position. The invention thus provides improved knockdown means adapted to a shuttle type accumulating conveyor.

Further objects, features and advantages of the present invention will become apparent from a consideration of the following description, the appended claims, and the accompanying drawing in which:

FIG. 8 is an enlarged fragmentary elevational view at one station, showing the transfer bar in its advanced position;

FIG. 9 is an enlarged detail sectional view as seen from substantially the line 9—9 in FIG. 1;

FIG. 10 is a fragmentary sectional view of the accumulating conveyor showing a knockdown member and taken from substantially the line 10—10 in FIG. 9.

DETAILED DESCRIPTION

Figure 2:
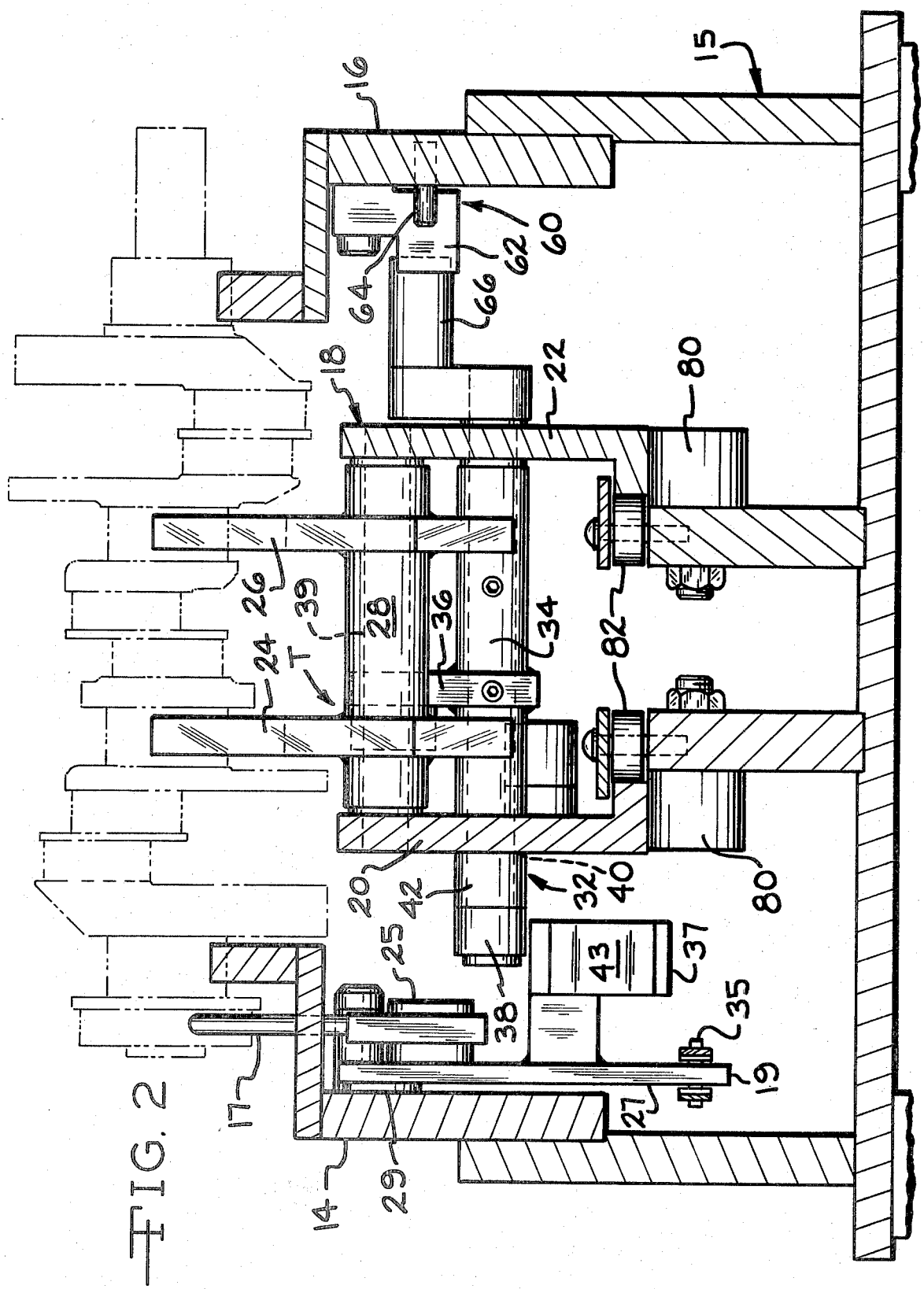
FIG. 2 is a transverse sectional view of the accumulating conveyor taken from substantially the line 2—2 in FIG. 1.
Figure 3:
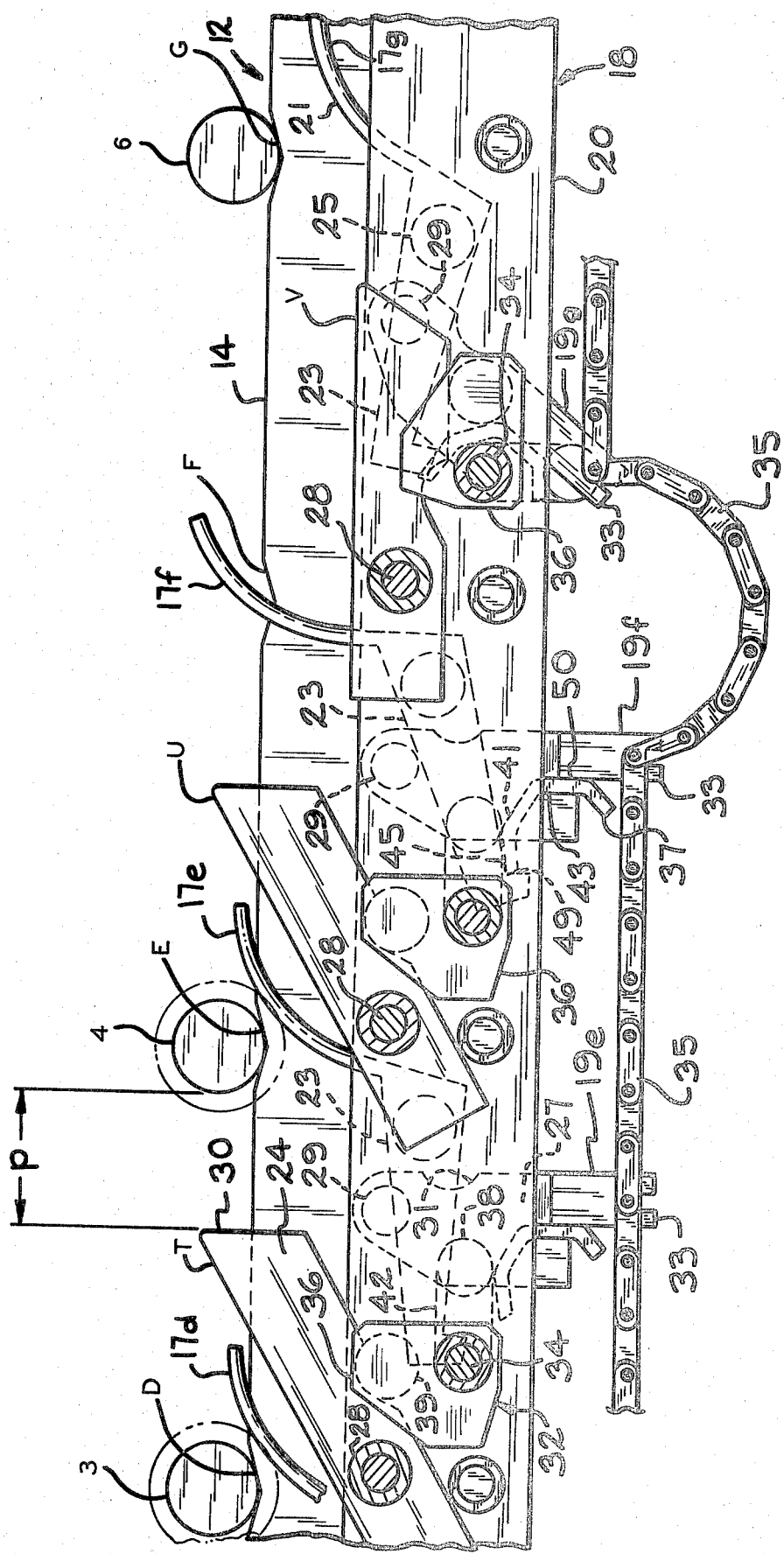
FIG. 3 is a fragmentary elevational view of a portion of the accumulating conveyor of this invention with portions broken away for the purpose of clarity and showing the transfer bar in its fully retracted position.

Referring to the drawing, the accumulating conveyor of the present invention, indicated generally at 10, is shown in FIG. 3 consisting of an elongated support 12 formed by a pair of parallel horizontally extending rails 14 and 16 (FIG. 2). The rails 14 and 16 are components of a stationary frame 15 installed at a selected site. A series of longitudinally spaced stations C, D, E, F, G, etc. are provided on the elongated support 12 through which a plurality of workpieces or articles 1, 2, 3, 4, 5, etc. are movable. It is to be understood that there are stations behind station D and in front of station G and that as viewed in FIGS. 3-5, the articles are advanced forwardly from left to right. Stations D, E and G are occupied by the articles 3, 4 and 6 while station F is empty in FIG. 3.

An article sensor assembly 17 (indicated at 17d, 17e, 17f, etc.) and an actuator assembly 19 (indicated at 19d, 19e, 19f, etc.) are provided at each station. The sensors 17 and actuator assemblies 19 are secured to the stationary frame rail 14. Each sensor assembly 17 includes a sensing bar 21 and a lower arm 23 and is pivotally mounted on the rail 14 by means of a pin 25. The sensor 17 is thus capable of rotation about the pin 25 between an article-sensed position and an empty station position. The center of gravity of the sensor 17 is on the lower arm 23 so that the sensor 17 is biased toward its empty station position. As seen in FIG. 3, the articles 3, 4 and 6 at stations D, E and G overcome the gravitational bias and hold the sensors 17d, 17e and 17g in their article-sensed positions. At the empty station F, the sensor 17f rests in its empty station position, wherein the sensing bar 21 is raised and the lower arm 23 is lowered relative to the article-sensed position.

Figure 4:
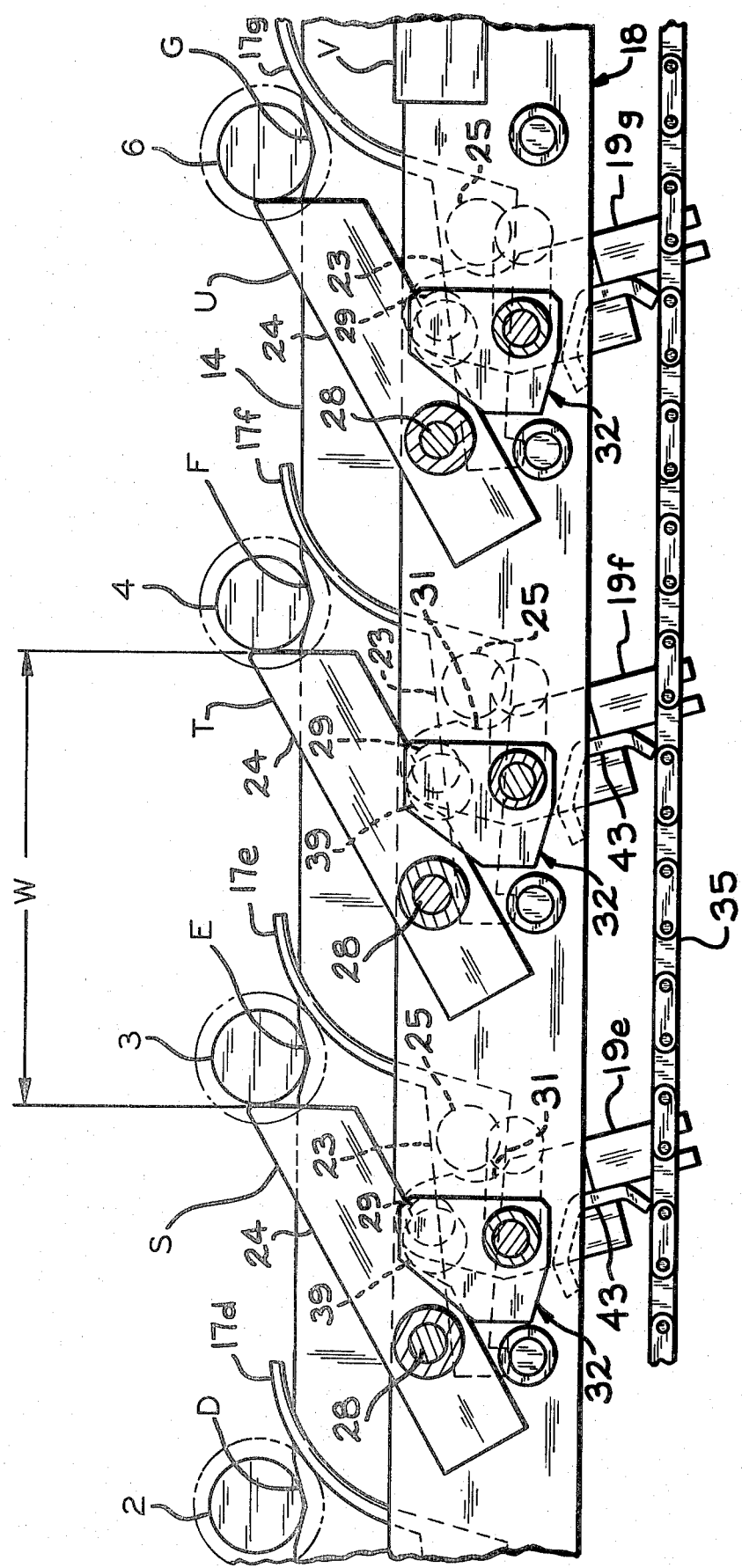
FIG. 4 is a fragmentary elevational view similar to FIG. 3, but showing the transfer bar in its fully advanced position.

Each actuator assembly 19 includes a plate 27 pivotally mounted by a pin 29 on the rail 14. The plate 27 has a recess 31 in one side so that when the plate pivots in a counterclockwise direction (as seen in FIG. 4) it is not obstructed by the sensor pin 25. At the lower end of the plate 27 is a downwardly extending bifurcated arm 33 to which a chain 35 is affixed. The chain 35 connects adjacent actuator assemblies 19. Also provided on the plate 27 is a hollow cam 37 having an upright cam surface 50, an inclined cam surface 41, a concave inner surface 43 and a protruding nose 45 which is adapted to engage a notch 49 in the lower arm 23 of a sensor 17 in the empty station position.

As seen in FIGS. 3-4, the actuator assemblies 19 are pivotally mounted on the rail 14 for pivotal movement between an operative position, an inoperative position and an advanced position. Actuator assemblies 19e and 19f are shown in their operative positions and actuator assembly 19g in its inoperative position in FIG. 3. In FIG. 4 all actuator assemblies are shown in their advanced positions. The actuators 19 are gravitationally biased toward their operative positions.

Figure 5:
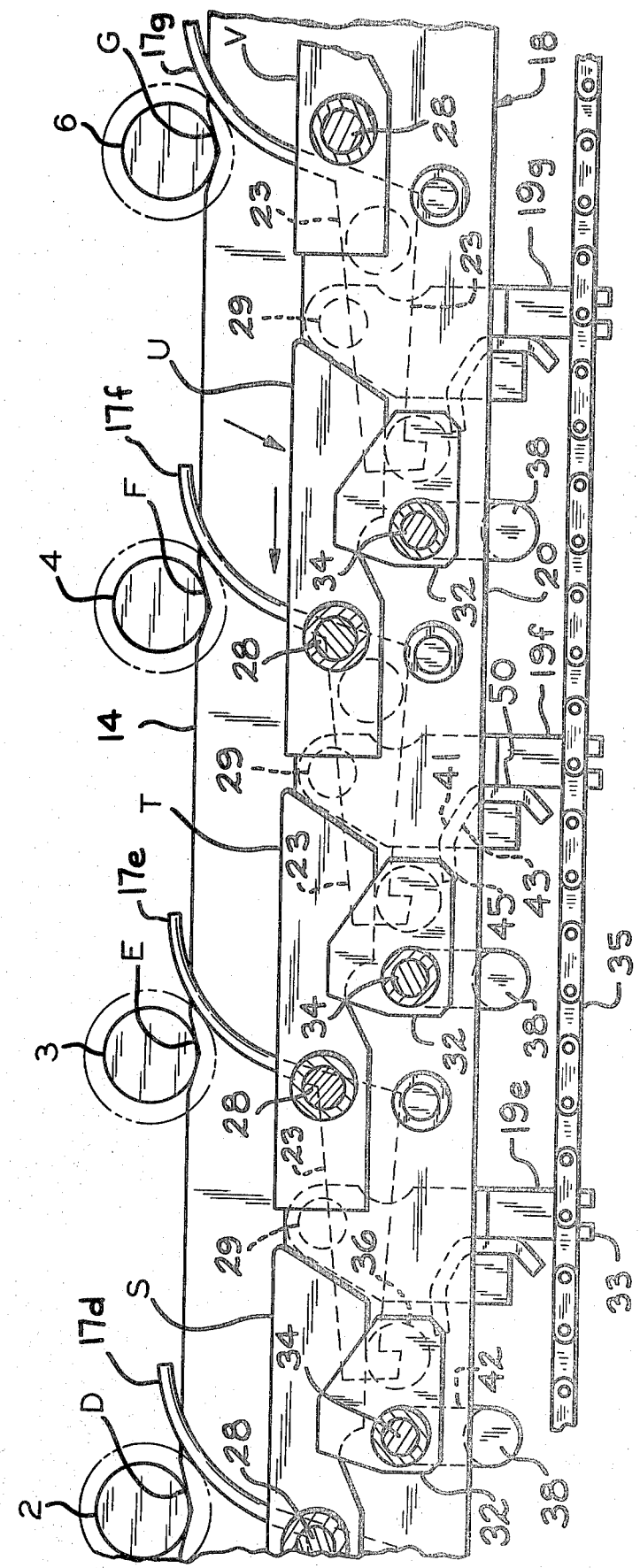
FIG. 5 is a view similar to FIGS. 3-4, but showing the transfer bar at a position on its return stroke.

The accumulating conveyor 10 further includes a transfer bar 18 that consists of a pair of parallel rails 20 and 22 that are movable forwardly to the right and rearwardly to the left longitudinally of the elongated support 12. Suitable drive means (FIG. 1) are provided for moving the transfer bar 18 through a work cycle as seen in FIGS. 3-5. The initial movement of the transfer bar 18 is rearwardly to its FIG. 3 position. The transfer bar 18 is then moved forwardly (FIG. 4) to advance articles, then rearwardly again as seen in FIG. 5. As seen in FIGS. 3-4, the work cycle calls for the transfer bar 18 to be moved forwardly a distance substantially greater than the distance between adjacent stations and substantially less than twice the distance between stations.

Figure 7:
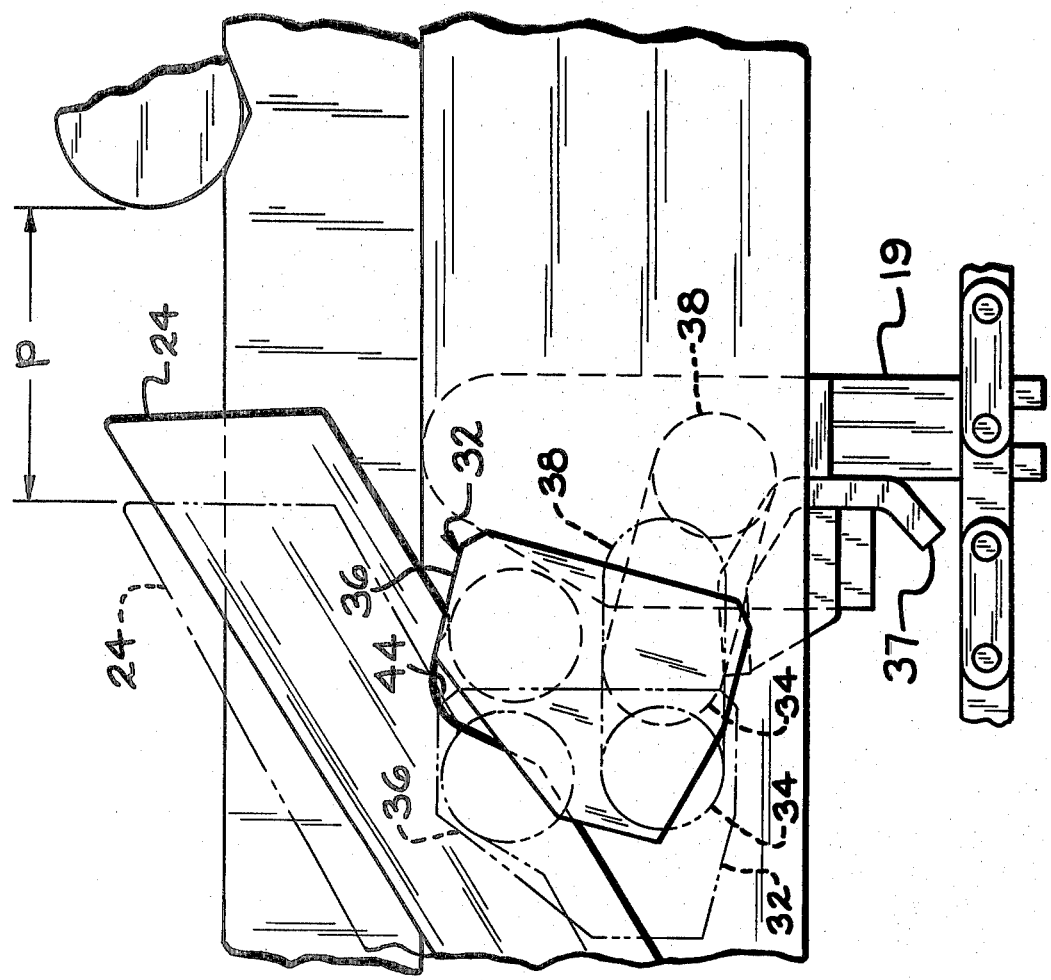
FIGS. 6-7 are enlarged fragmentary views at one station of the accumulating conveyor, showing various successive positions of a feed unit and a feed unit setting assembly.
Figure 6:
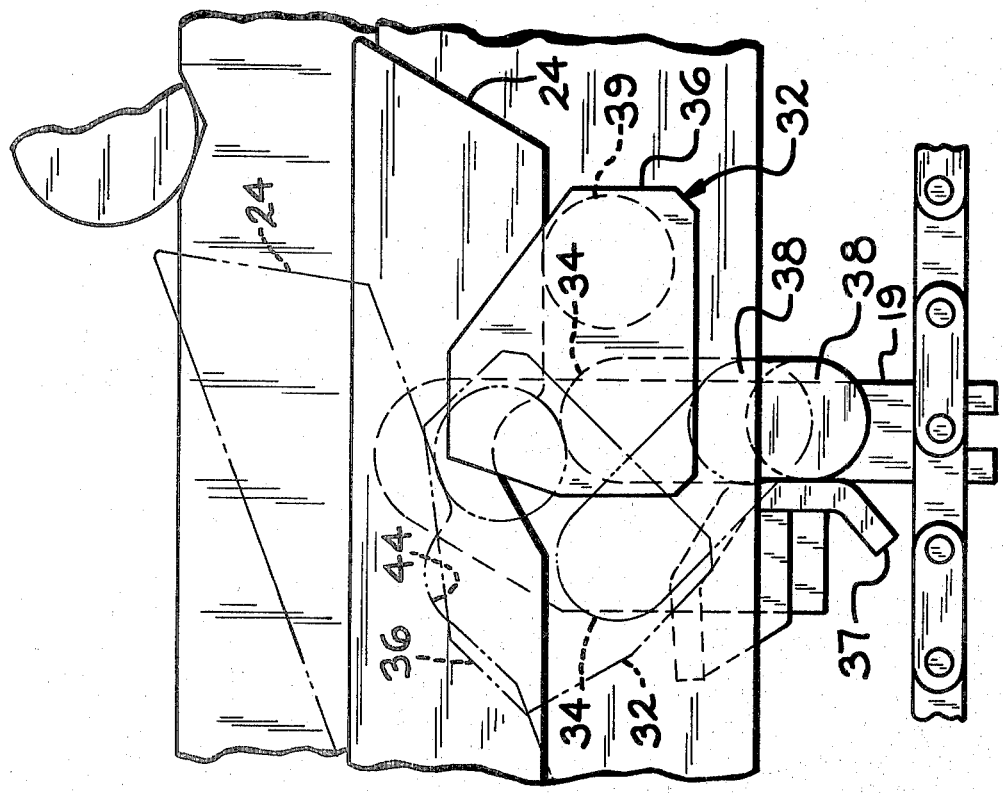

The transfer bar carries a plurality of feed units, indicated by the letters T, U and V in FIG. 3, and a plurality of feed unit setting assemblies 32. The feed units are pivotally mounted on the transfer bar 18 and are spaced apart longitudinally of the elongated support 12 to correspond with the spacing of the stations D, E, F and G. As shown in FIG. 2, the feed unit T is pivotally mounted on the parallel rails 20 and 22. The feed unit T and remaining feed units each consists of a pair of parallel feed arms 24 and 26 fixed to a shaft 28 that extends transversely of and is connected to the parallel rails 20 and 22. As shown in FIGS. 6-7, the arms 24 and 26 are movable between an idle position, wherein the arms 24 and 26 extend substantially horizontally, and a feed position wherein the arms extend above the top of the rails 14 and 16. In FIG. 3, feed units T and U are in the feed position while feed unit V is in the idle position. Each feed unit has a forward surface 30 adapted to contact an article, when the feed unit is in the feed position, to advance the article to its next succeeding station.

Each feed unit setting assembly 32 comprises a shaft 34 rotatably mounted on and extending through the transfer bar rails 20 and 22 at a location below the shaft 28 of the associated feed unit. A pusher arm 36 extends radially from and is connected to the shaft 34 between the shaft ends (FIG. 2). A follower member 38 is connected to one end 40 of the shaft 34 by an arm 42 which is fixed generally at a right angle with respect to the pusher arm 36.

As shown in FIG. 3, each feed unit setting assembly 32 is pivotally movable between a rest position and an actuated position. The setting assemblies associated with feed units T and U are shown in their actuated positions, while the setting assembly associated with feed unit V is in its rest position. When the setting assembly 32 is in the rest position, the follower 38 is located below the shaft 34 and the pusher arm 36 is located to the right of the shaft 34. As the setting assembly rotates in a counterclockwise direction toward its actuated position (FIGS. 6-7), a shaft 39 on the pusher arm 36 engages the feed arms 24 and 26 and the pusher arm 36 rotates the associated feed unit toward its feed position. When the setting assembly 32 reaches its actuated position, the pusher arm shaft 39 extends into recesses 44 formed in the arms 24 and 26 of the associated feed unit, holding the feed unit in its feed position. In moving from its rest position to its actuated position, the setting assembly 32 rotates ninety degrees. In the actuated position, the pusher arm 36 is located above the shaft 34 and the follower 38 is located to the right of the shaft 34.

In operation, assume initially that stations D, E, G and all stations in front of station G and behind station D are occupied as shown in FIG. 3. Only station F is empty. Thus, the transfer bar 18 will be moved through a work transfer cycle, to advance article 4 from station E to station F, to advance article 3 from station D to station E, and to advance all articles at stations behind station D to their next adjacent stations while maintaining article 6 at station G and maintaining all articles to the right of station G at their present stations. Thus it will be seen that all feed units to the left of the empty station will be moved to their feed positions, while feed units to the right of the empty station will remain in their idle positions while the transfer bar 18 is advanced. To accomplish this, all feed unit setting assemblies 32 to the left of the empty station will be actuated while those to the right will remain in their rest positions.

At the empty station F, the article sensor 17f is in its empty station position. The lower arm 23 is gravitationally urged into a lowered position wherein the notched portion 49 engages and receives the protruding nose 45 on the cam 37 of the actuator assembly 19f. The actuator assembly 19f is thus incapable of rotating in a clockwise direction to its inoperative position and is essentially held stationary by the sensor 17f. At all other (occupied) stations, the sensors 17 are in their article-sense positions and their notched portions 49 are swung into a clearance relationship with the protruding noses 45 of the corresponding actuator assemblies 19.

Figure 1:
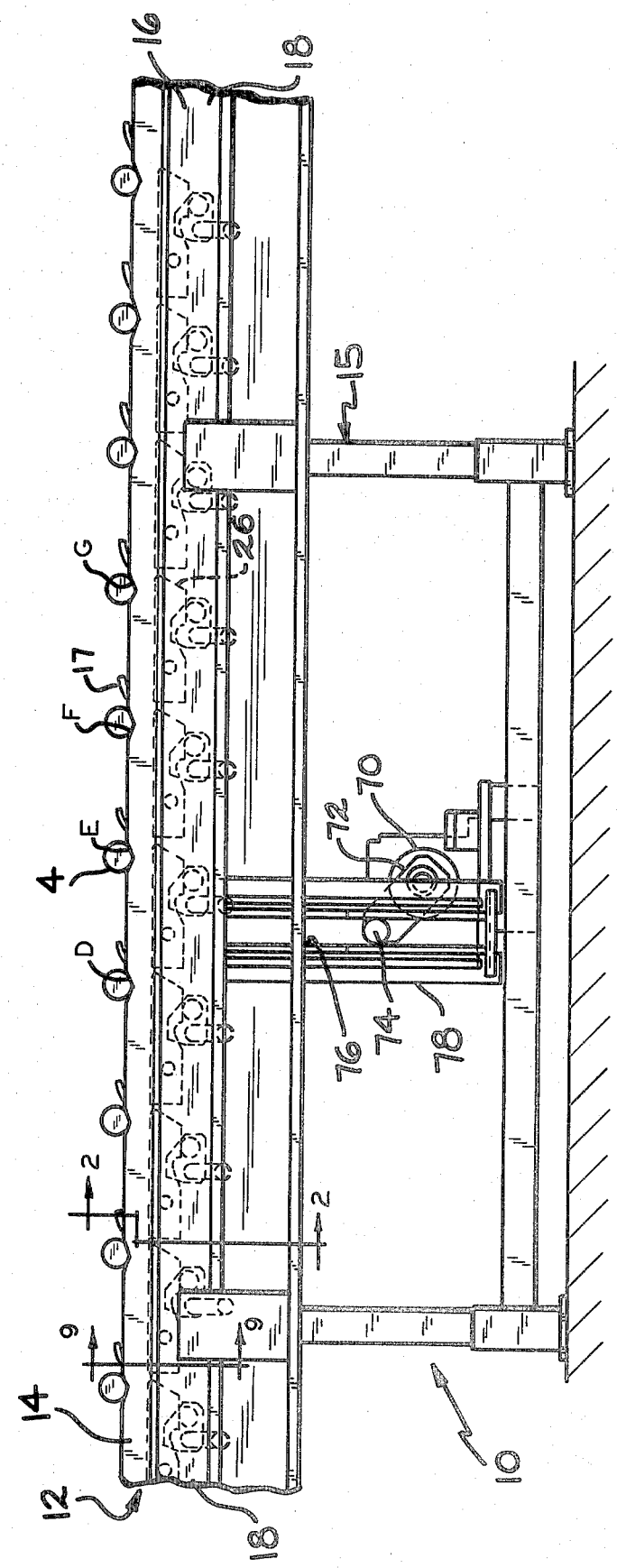
FIG. 1 is a side view of the accumulating conveyor of this invention.

The work transfer cycle commences with the transfer bar in its "start" position, as seen in FIG. 1, wherein all feed units are initially in their idle positions. It is to be seen that this position is labelled the "start" position arbitrarily for clarity of explanation, and in practice the cycle is continuous and other positions may be referred to as the "start" position. From the "start" position, the transfer bar 18 is moved a predetermined distance to the left as seen in FIGS. 1 and 3. Moving to the rear with the transfer bar 18 are the feed units T, U, V, etc. and the setting units 32, initially in their rest positions. As each setting unit 32 moves rearward, its follower member 38 initially strikes the upright cam surface 50 on an associated actuator member 19. At the empty station F, where the cam 37 on the actuator 19f is held in its operative position by the sensor 17f, the follower 38 rides on the cam surfaces 50 and 41 causing the setting assembly 32 to rotate into its actuated position. This causes the associated feed unit U to be raised to its feed position. At stations to the rear of station F, the actuator members 19 are not held by the associated sensors 17. However, since the actuator 19f is fixed and thus the chain 35 is held at station F, all actuators to the left of station F are prevented from rotating clockwise to their inoperative positions by the tension in the chain 35. Thus, at stations to the rear of station F the same result is achieved as at station F; the followers 38 ride up on the cam surfaces 50 and 41, the setting units 32 rotate to their actuated positions, and all feed units to the rear of station F are thereby raised to their feed positions. Finally, at station G and all stations in front of station F, the actuator members 19 are not fixed at all. When the follower 38 strikes the cam 37 and continues moving rearward with the transfer bar 18, the actuator member 19 simply pivots clockwise out of the way to its inoperative position. The setting assembly 32 does not rotate to its actuated position and thus feed units in front of station F are not raised to their feed positions.

As seen in FIGS. 6-7, the transfer bar 18 must be moved rearwardly a sufficient distance to ensure that the feed units can pivot to their feed positions without striking the articles. Thus, when the transfer bar 18 has completed its rearward movement each feed unit is located a specified distance behind the article it will transfer. This pretravel distance is indicated at p in FIGS. 3 and 7. The pretravel distance p must be sufficiently large to allow for various sizes of articles.

The transfer bar 18 is next advanced forwardly to deposit the articles at their next adjacent stations. In FIG. 4 the transfer bar has moved to its fully advanced position. The distance travelled by the transfer bar 18 in the forward direction is equal to the pretravel distance p plus the distance between stations (indicated by w in FIG. 4). Thus, during the forward stroke the articles are advanced a distance w while the transfer bar 18, the setting units 32 and the feed units advance a distance (p plus w).

The problem usually encountered in shuttle type accumulators, and the one circumvented in this invention, is that since many of the conveyor parts travel distances greater than the distance between stations they tend to be obstructed by stationary conveyor parts, causing the drive mechanism to bind. This problem is illustrated in FIGS. 3 and 8. From station G in FIG. 3 the setting assembly 32 moves in its rest position into contact with the actuator assembly 19h at station H, as seen in FIG. 8. This contact and further forward movement of the transfer bar 18 do not cause the drive mechanism to bind, however, because of the combination of three features in the present invention. First, the concave cam rear surface 43 is adapted to receive the follower 38 on the setting assembly 32 as it moves forward. Thus, the setting assembly 32 moves a greater distance before contacting the actuator assembly 19h. Second, as the transfer bar 18 moves forward after the follower 18 contacts the cam surface 43, the actuator assembly 19h rotates in a counterclockwise direction to its advanced position (FIG. 8). The chain 35 does not prevent this rotation because the chain is not fixed at any point to the stationary rail 14. Finally, the recess 31 formed in the front side of the actuator plate 27 allows rotation of the actuator assembly 19 (FIG. 4) without interference with the sensor pin 25. In summary, the concave cam surface 43, the chain 35 and the recess 31 cooperate to absorb the extra travel distance of the setting assembly 32 and ensure unobstructed forward travel of the transfer bar 18.

Figure 12:
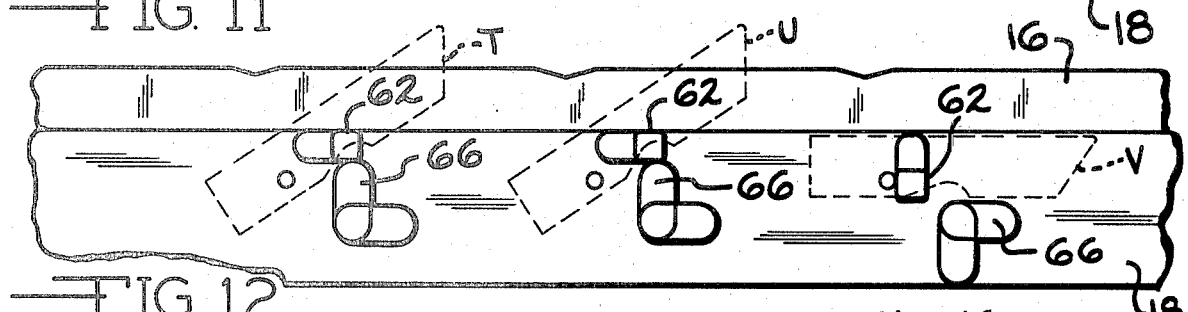

The final movement of the transfer bar 18 in the work cycle is rearward from the position in FIG. 4 to the position in FIG. 5. During this movement each of the setting assemblies 32 is moved past a knockdown assembly 60 to ensure that all setting assemblies 32 and all feed units are moved to their rest and idle positions. A knockdown assembly 60 is provided at each station. As seen in FIGS. 9-10, each knockdown assembly 60 comprises a knockdown lug 62 pivotally mounted on the side rail 16 and a stop pin 64 secured to the rail 16 adjacent the lug 62 on the rear side. The lug 62 is pivotally movable between an engagement position and a removed position, and is gravitationally biased toward its engagement position. The lug 62 in FIG. 10 is shown in its engagement position, while some of the lugs 62 in FIG. 12 are shown in their removed positions. The knockdown mechanism further includes a rigid arm 66 secured to the shaft 34 of each feed unit setting assembly 32 and extending outwardly therefrom. As seen in FIG. 2, the rigid arm 66 and the follower arm 42 are located at opposite ends of the shaft 34 and are maintained at right angles relative to each other. Thus, when the feed unit setting assembly 32 is in its actuated position, the rigid arm 66 is operable to engage the knockdown lug 62. When the setting assembly 32 is in its rest position the arm 66 will not be in a position to contact the lug 62.

Figure 11:
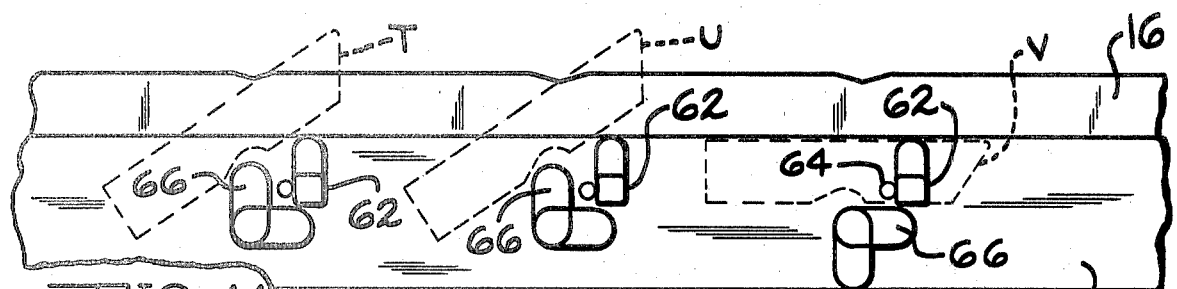
FIGS. 11-16 are somewhat diagrammatic longitudinal sectional views of the accumulating conveyor showing operation of the knockdown members.
Figure 13:
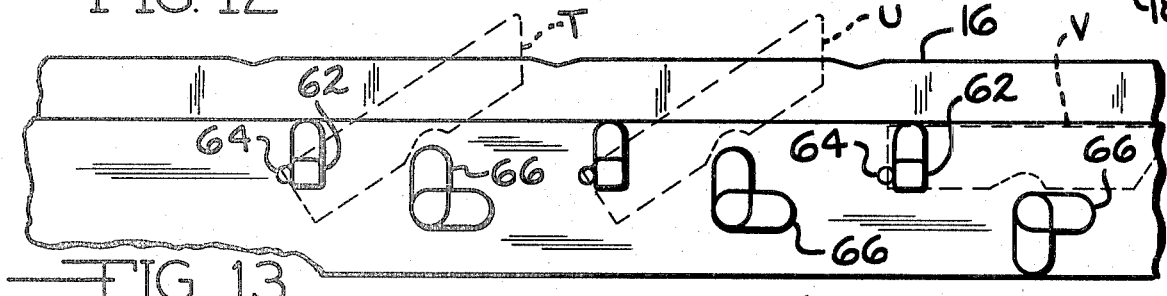
Figure 14:
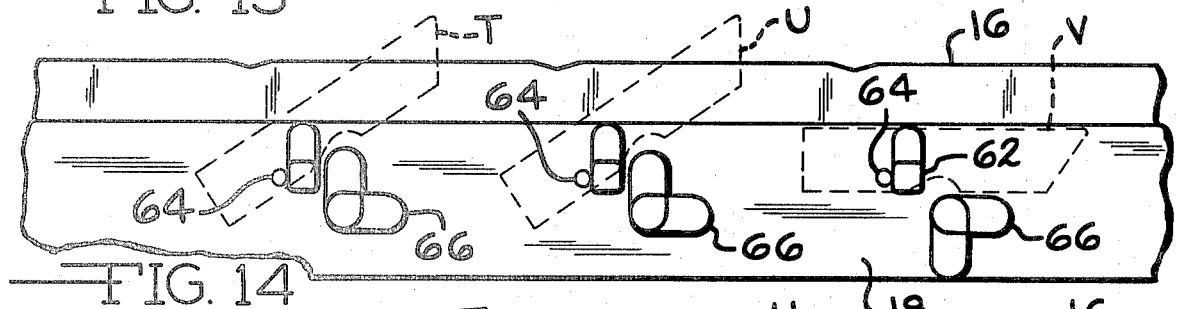
Figure 15:
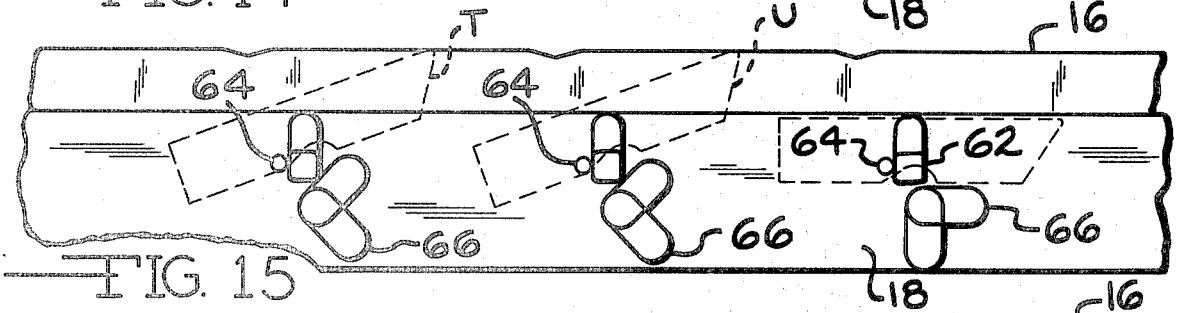
Figure 16:
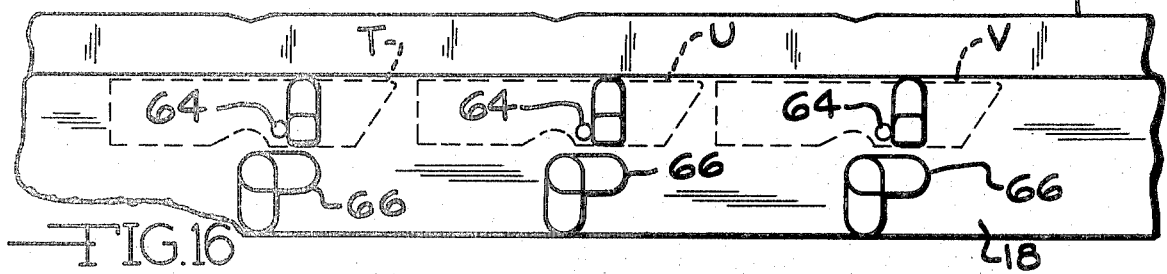

The knockdown mechanism of this invention is shown in operation in FIGS. 11-16. FIGS. 11 and 12 show the accumulating conveyor at positions on its forward stroke. The arms 66 on feed unit setting assemblies in their actuated positions contact the corresponding knockdown lugs 62 and move the lugs 62 to their removed positions. The setting assemblies 32 thus remain in their actuated positions as the transfer bar 18 completes its forward stroke (FIG. 13). The transfer bar 18 begins its return stroke with the setting assemblies 32 still in their actuated positions (FIG. 14). The arms 66 contact the knockdown lugs 62 and force the lugs 62 against the stop pins 64. The lugs 62 are thereby maintained in their engagement position, and abutment of the arms 66 against the lugs 62 causes the shafts 34 to rotate and move the setting assemblies 32 to their rest positions (FIGS. 15-16). This ensures that all of the feed units will be in their idle positions at the start of the next work cycle.

The shuttle type accumulating conveyor 10 is driven by a motor assembly 70 as seen in FIG. 1. An arm 72 is fixed to the motor shaft and carries a roller 74 which is movable in a track provided on a carriage 78. The carriage 78 is fixed to the transfer bar 18 which reciprocates on pairs of rollers 80 and 82 (FIG. 2) mounted on the frame 15. Back and forth rotation of the motor shaft causes the transfer bar 18 to be moved horizontally the rerequired distance heretofore described. The conveyor 10 is thus adaptable to be driven by a continuous-drive single direction motor.

From the above description, it can be seen that this invention provides an improved shuttle type accumulating conveyor 10 in which initial rearward movement of the transfer bar 18 places all feed units behind an empty station in feed positions. The accumulating conveyor 10 utilizes the chain 35 to maintain all actuator assemblies 19 in their operative positions behind an empty station so that all feed units behind the empty station are moved to their feed positions. The chain 35 allows actuator assemblies 19 in front of any empty station to be swung to inoperative positions so as to maintain feed units in front of the empty station in idle positions.

When the transfer bar 18 is moved forwardly, part interference and binding of the drive mechanism is prevented by the concave cam surface 43, the chain 35 and the recess 31. The chain 35 allows the actuator assemblies 19 to be moved to advanced positions, while the recess 31 and cam surface 43 ensure clearance between the actuator assemblies 19 and other conveyor parts. An improved knockdown assembly 60 ensures that feed units are returned to their idle positions before the start of a new work transfer cycle.

The invention thus provides an accumulating conveyor 10 which employs a simple drive mechanism, does not generate excessive noise during operation, requires little maintenance, and, if necessary, is easily serviced.

What is claimed is:

1. A shuttle type accumulating conveyor comprising an elongated support along which a plurality of articles are movable through a series of longitudinally spaced-apart stations, a transfer bar mounted for movement forwardly and rearwardly longitudinally along said elongated support, a plurality of feed units on said transfer bar movable between idle and feed positions, drive means for moving said transfer bar back and forth through a work cycle for moving all articles situated behind an empty station to their next adjacent stations, said work cycle including a forward stroke wherein said transfer bar moves forwardly a predetermined distance which is substantially greater than the distance between stations and a return stroke wherein said feed units are initially moved to their idle positions, a plurality of feed unit setting assemblies on said transfer bar operatively associated with said feed units, each of said feed unit setting assemblies being movable between rest and actuated positions and being operable when moved to the actuated position to move an associated feed unit to the feed position, a plurality of actuator assemblies mounted at said stations for movement between an operative position, an inoperative position and an advanced position, each of said actuator assemblies being operatively associated with a selected feed unit setting assembly, a chain member connecting adjacent actuator assemblies, sensing means at each station for sensing the absence of an article, each of said sensing means being operatively associated with a corresponding actuator assembly so that at an empty station said sensing means causes said actuator assembly to be maintained in its operative position, said chain member being provided to maintain all actuator members in operative positions behind a first member maintained in the operative position so that when said transfer bar is moved fully rearwardly said feed unit setting assemblies engage all actuator assemblies held in operative positions and in response to such engagement move to actuated positions to move their associated feed units to feed positions, and anti-bind means on each of said actuator assemblies to ensure obstructed forward movement of said transfer bar comprising a hollow rear portion formed in said actuator assembly so that when said transfer bar is moved fully forwardly, a feed unit setting assembly in its rest position extends into said hollow portion on one of said actuator assemblies and engages said actuator assembly to move it to said advanced position.

2. The accumulating conveyor according to claim 1, wherein each of said actuator assemblies comprises a plate member pivotally mounted on said elongated support and having a front surface, a rear surface and an end portion to which said chain member is secured, and a cam member secured to said plate member operable to engage a feed unit setting assembly in its rest position, said anti-bind means hollow rear portion being formed in said cam member.

3. The accumulating conveyor according to claim 2, wherein said anti-bind means further includes a recess formed in said plate member front surface to provide clearance between said actuator assembly and said sensing means when said actuator assembly is in its advanced position.

4. The accumulating conveyor according to claim 2, wherein said cam member further includes an upwardly and rearwardly inclined surface operable upon rearward movement of said transfer bar to contact a feed unit setting assembly in its rest position, and a rearwardly protruding portion operable to engage an associated sensing means when said sensing means is in its empty station position.

5. The accumulating conveyor according to claim 4, wherein said sensing means is pivotally mounted on said elongated support for pivotal movement between an article sensed position and an empty station position, said sensing means having a notched end portion operable to receive the protruding portion of an associated actuator assembly when said sensing means is in its empty station position.

6. The accumulating conveyor according to claim 5, wherein each of said sensing means is gravitationally biased toward its empty station position.

7. The accumulating conveyor according to claim 1, wherein said sensing means and said actuator assemblies are mounted on said elongated support at selected positions associated with said stations.

8. The accumulating conveyor according to claim 1, wherein each of said actuator assemblies is pivotally mounted on said elongated support for pivotal movement between said operative position, said inoperative position, and said advanced position and further including means biasing said actuator assemblies toward their operative positions.

9. The accumulating conveyor according to claim 8, wherein said actuator members are gravitationally biased toward their operative positions.

10. The accumulating conveyor according to claim 4, wherein each of said feed unit setting assemblies includes a follower member, said follower member being operable when said feed unit setting assembly is in its rest position and the associated actuator assembly is held in its operative position and upon rearward movement of said transfer bar to ride up on said upwardly and rearwardly inclined cam surface on the associated actuator assembly and cause said corresponding feed unit to be moved to its feed position, and said follower member being operable when said feed unit setting assembly is in its rest position and upon forward movement of said transfer bar to be received into said hollow rear portion on the next adjacent actuator assembly.

11. The accumulating conveyor according to claim 10, wherein each of said feed unit setting assemblies is pivotally mounted on said transfer bar for pivotal movement between a rest position and an actuated position so that when said follower member rides up on said cam on the associated actuator assembly said feed unit setting assembly is caused to move to its actuated position.

12. The accumulating conveyor according to claim 1 and further including knockdown means associated with each of said feed unit setting assemblies to move said feed unit setting assemblies in the actuated positions to rest positions upon return of said transfer bar rearwardly after full forward movement of said transfer bar.

13. In a shuttle type accumulating conveyor comprising an elongated support along which a plurality of articles are movable forwardly through a series of longitudinally spaced-apart stations, a transfer bar mounted for movement back and forth longitudinally along said elongated support, drive means for moving said transfer bar through a work cycle which includes a forward stroke wherein said transfer bar moves forwardly a distance substantially greater than the distance between stations, a plurality of feed units on said transfer bar movable between idle and feed positions, a plurality of feed unit setting assemblies on said transfer bar operatively associated with said feed units, each of said feed unit setting assemblies being movable between rest and actuated positions and being operable when moved to the actuated position to move an associated feed unit to the feed position, a plurality of actuator assemblies mounted at said stations for movement between an operative position, an inoperative position and an advanced position, each of said actuator assemblies being operable in said operative position to force a corresponding feed unit setting assembly toward its actuated position, sensing means at each station for sensing the absence of an article, each sensing means being operable upon sensing the absence of an article to maintain an associated actuator assembly in its operative position, knockdown means for moving feed unit setting assemblies in their actuated positions to their rest positions upon rearward movement of said transfer bar after full forward movement of said transfer bar, said knockdown means comprising lug means pivotally mounted on said elongated support at each station movable between an operative position and an inoperative position and stop means mounted on said elongated support adjacent said rigid arm so that when said transfer bar moves forward, feed unit setting assemblies in their actuated positions contact said lug means and move said lug means to said inoperative positions, and when said transfer bar subsequently moves rearwardly, feed unit setting assemblies in their actuated positions engage said lug means and said stop means maintains said lug means in the operative positions thereof thereby moving said feed unit setting assemblies to their rest positions.

14. The accumulating conveyor according to claim 13, wherein each of said feed unit setting assemblies comprises a pair of arms maintained at a fixed angle relative to each other and pivotally mounted on said transfer bar for pivotal movement between actuated and rest positions, said movement being generated by abutment of one of said arms against a fixed object during forward or rearward movement of said transfer bar.

15. A shuttle type accumulating conveyor comprising an elongated generally horizontal support along which a plurality of articles are movable through a series of longitudinally spaced-apart stations, a transfer bar mounted for movement forwardly and rearwardly longitudinally along said elongated support, a plurality of feed units on said transfer bar movable between idle and feed positions, drive means for moving said transfer bar back and forth through a work cycle for moving all articles situated behind an empty station to their next adjacent stations, said work cycle including a forward stroke wherein said transfer bar moves forwardly a predetermined distance which is substantially greater than the distance between stations and a return stroke wherein said feed units are returned to their idle positions, means including a plurality of actuator assemblies positioned in the path of movement of said feed units during the return stroke of said transfer bar for moving said feed units from said idle positions to said feed positions, said actuator assemblies being mounted at said stations for movement between an operative position, an inoperative position and an advanced position, a chain member connecting adjacent actuator assemblies, sensing means at each station for sensing the absence of an article, each of said sensing means being operatively associated with a corresponding actuator assembly so that at an empty station said sensing means causes said actuator assembly to be maintained in its operative position, said chain member being provided to maintain all actuator members in operative positions behind a first member maintained in the operative position so that when said transfer bar is moved fully rearwardly all actuator assemblies held in operative positions provide for movement of all corresponding feed units to feed positions, and means on each of said actuator assemblies enabling unobstructed movement of said transfer bar through said entire forward stroke in which said transfer bar is moved said predetermined distance.

* * * * *

UNITED STATES PATENT AND TRADEMARK OFFICE
CERTIFICATE OF CORRECTION

PATENT NO. : 4,399,907
DATED : August 23, 1983
INVENTOR(S) : Douglas D. Wiknich and Michael J. Peabody It is certified that error appears in the above-identified patent and that said Letters Patent are hereby corrected as shown below:

Column 9, line 39, "obstructed" should read --unobstructed--.

Signed and Sealed this

Fifteenth Day of November 1983

[SEAL]

Attest:

GERALD J. MOSSINGHOFF

Attesting Officer     Commissioner of Patents and Trademarks